United States Patent
Neveux et al.

(10) Patent No.: US 11,935,665 B2
(45) Date of Patent: Mar. 19, 2024

(54) METHOD AND FACILITY FOR TREATING AQUEOUOS EFFLUENTS FROM THE PRIMARY CIRCUIT OF A NUCLEAR POWER PLANT COMPRISING BORIC ACID

(71) Applicants: Electricite de France, Paris (FR); Centre National de la Recherche Scientifique (CNRS), Paris (FR); Universite de Lorraine, Nancy (FR)

(72) Inventors: Thibaut Neveux, Nanterre (FR); Eve Bailleul, Lyons (FR); Christophe Castel, Vandoeuvre-les-Nancy (FR); Eric Favre, Nancy (FR)

(73) Assignees: Electricite de France (FR); Centre National de la Recherche Scientifique (CNRS) (FR); Universite de Lorraine (FR)

( * ) Notice: Subject to any disclaimer, the term of this patent is extended or adjusted under 35 U.S.C. 154(b) by 137 days.

(21) Appl. No.: 17/311,051

(22) PCT Filed: Dec. 4, 2019

(86) PCT No.: PCT/EP2019/083739
§ 371 (c)(1),
(2) Date: Jun. 4, 2021

(87) PCT Pub. No.: WO2020/115167
PCT Pub. Date: Jun. 11, 2020

(65) Prior Publication Data
US 2022/0044834 A1    Feb. 10, 2022

(30) Foreign Application Priority Data

Dec. 5, 2018   (FR) ..................... 1872375

(51) Int. Cl.
*B01D 37/00*   (2006.01)
*B01D 61/02*   (2006.01)
(Continued)

(52) U.S. Cl.
CPC ............. *G21F 9/06* (2013.01); *B01D 61/025* (2013.01); *B01D 61/026* (2022.08); *B01D 61/08* (2013.01);
(Continued)

(58) Field of Classification Search
CPC ...... B01D 37/00; B01D 37/041; B01D 61/02; B01D 61/025; B01D 61/026; B01D 61/08;
(Continued)

(56) References Cited

U.S. PATENT DOCUMENTS 3,380,889 A   4/1968 Loose
3,795,317 A * 3/1974 Van Zon ................ B01D 61/08
                                                 210/336

(Continued)

FOREIGN PATENT DOCUMENTS

CN    1236330 A    11/1999
CN   102481525 A    5/2012
(Continued)

OTHER PUBLICATIONS

Bartova Sarka et al: "Reverse osmosis for the recovery of boric acid from the primary coolant at nuclear power plants", Nuclear Engineering and Design, vol. 300, Feb. 11, 2016 (Feb. 11, 2016), pp. 107-116.
(Continued)

*Primary Examiner* — Allison G Fitzsimmons
(74) *Attorney, Agent, or Firm* — Lerner David LLP (57) ABSTRACT

The present invention relates to a process for treating aqueous effluents from the primary circuit of a nuclear
(Continued)

power plant implementing a separation of boric acid using a reverse osmosis membrane, characterized by the fact that it comprises steps consisting of treating the effluents using a multi-stage assembly composed of reverse osmosis modules comprising a membrane with a high boron rejection rate, arranged in parallel and in series, and recycling of the intermediate products to different points in the assembly.

22 Claims, 7 Drawing Sheets

(51) Int. Cl.
  *B01D 61/08* (2006.01)
  *B01D 61/12* (2006.01)
  *B01D 69/12* (2006.01)
  *G21F 9/06* (2006.01)
(52) U.S. Cl.
  CPC ............ *B01D 61/12* (2013.01); *B01D 69/12* (2013.01); *B01D 2311/25* (2013.01); *B01D 2317/025* (2013.01); *B01D 2317/04* (2013.01)
(58) Field of Classification Search
  CPC ............ B01D 61/12; B01D 2267/00; B01D 2267/30; B01D 2267/60; B01D 2267/70; B01D 2311/06; B01D 2311/08; B01D 2311/25; B01D 2311/251; B01D 2311/252; B01D 2317/00; B01D 2317/02; B01D 2317/04; B01D 2317/022; B01D 2317/025; B01D 2317/06; B01D 2317/08; B01D 2319/00; B01D 2319/02; B01D 2319/04; B01D 2319/022; B01D 2319/025
  See application file for complete search history.

(56) References Cited

U.S. PATENT DOCUMENTS

| | | | |
|---|---|---|---|
| 3,898,158 A | 8/1975 | Miller | |
| 4,983,302 A | 1/1991 | Balint et al. | |
| 2004/0245175 A1* | 12/2004 | Godec | B01D 61/54 436/178 |
| 2006/0169634 A1 | 8/2006 | Hiro et al. | |
| 2011/0049055 A1 | 3/2011 | Wang et al. | |
| 2011/0147309 A1* | 6/2011 | Palacios | B01D 61/026 210/652 |
| 2016/0288047 A1 | 10/2016 | Fukuda et al. | |

FOREIGN PATENT DOCUMENTS

| | | |
|---|---|---|
| CN | 203631141 U | 6/2014 |
| CN | 207760179 U | 8/2018 |
| DE | 3605338 A1 | 8/1987 |
| EP | 0497641 A1 | 8/1992 |
| JP | H0568974 A | 3/1993 |
| KR | 1998078069 A | 11/1998 |
| KR | 20060051998 A | 5/2006 |
| WO | 9806483 A1 | 2/1998 |

OTHER PUBLICATIONS

French Search Report for Application No. FR 1872375, dated Oct. 22, 2019, 2 pages.
IAEA-TECDOC-91; "Processing of nuclear power plant waste streams containing boric acid" Oct. 1996, vol. 28 No. 06., 68 pages.
International Search Report for Application No. PCT/EP2019/083739, dated Mar. 13, 2020, 3 pages.
Ulrika Bark et al: "BATMAN—Best Available Technique Minimising All Nuclides This report approved Apr. 18, 2006 Lars-Gunnar Lindfors Scientific Director", Apr. 18, 2006, 107 pages.
International Search Report dated Jan. 11, 2024 for Chinese Application No. 20198008945.0 dated Jan. 16, 2024. 3 pages.

* cited by examiner

METHOD AND FACILITY FOR TREATING AQUEOUOS EFFLUENTS FROM THE PRIMARY CIRCUIT OF A NUCLEAR POWER PLANT COMPRISING BORIC ACID

CROSS-REFERENCE TO RELATED APPLICATIONS

The present application is a national phase entry under 35 U.S.C. § 371 of International Application No. PCT/EP2019/083739 filed Dec. 4, 2019, which claims priority from French Application No. 1872375 filed Dec. 5, 2018, all of which are incorporated herein by reference.

FIELD OF THE INVENTION

The present invention relates to the treatment of aqueous effluents from the primary circuit of nuclear power plants using water as coolant and boron as neutron poison, present as boric acid diluted in water.

More precisely, the present invention relates to the separation of boric acid from the primary circuit water of a nuclear power plant.

PRIOR ART

A nuclear power plant primarily consists of a first closed circuit, called the primary circuit, comprising a nuclear reactor through which water is circulated as a coolant. This water is circulated by pumps.

The water is heated to about 320° C. and remains in a liquid state because it is saturated under pressure at 155 bar. These calories are transferred via a heat exchanger through which a second water circuit, called the secondary circuit, runs.

This water becomes steam and is used to drive a turbine which, in turn, drives an alternator to produce electricity.

Once expanded, the steam is condensed through a second heat exchanger, called a condenser, cooled by an independent cold source.

This water in a liquid state driven by pumps follows another cycle by passing through the heat exchanger again.

It is well known that the water in the primary circuit of nuclear power plants can contain undesirable radiochemical compounds such as boric acid.

One objective of effluent treatment is separating the water from this radiochemical compound. Generally, the water of the primary circuit also contains gaseous compounds such as xenon, krypton, molecular nitrogen, molecular hydrogen, molecular oxygen or gaseous iodine compounds. Another general aim is to separate these gaseous compounds. Separation of the gaseous compounds can in particular take place before separation of the boric acid.

The water thus recovered can be recycled and the compounds treated, contained and disposed of by dedicated processes.

Different processes have already been proposed to provide the above-mentioned boric acid treatment.

Figure 1:
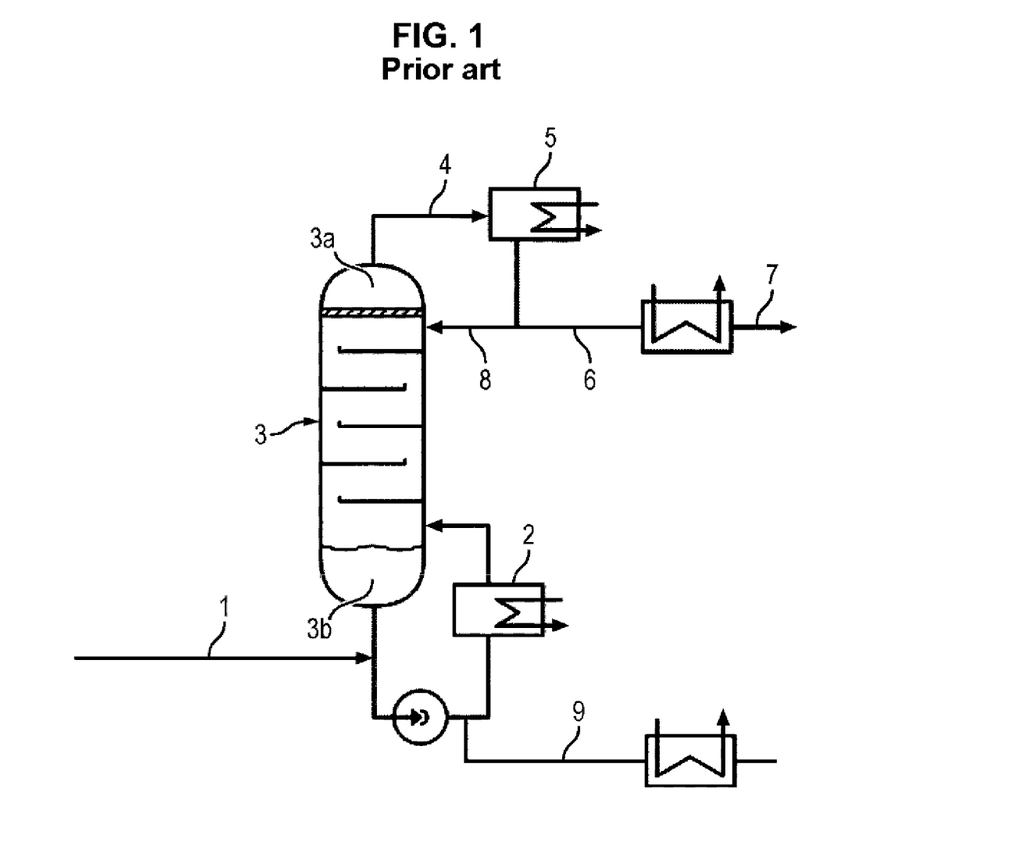

In practice, a thermal evaporation process, the general principle of which is shown in FIG. 1, is used today in operating nuclear power plants.

The effluents to be treated, referred to as "primary effluents", come from intentional discharges of fluid from the primary circuit. Such discharges can occur during normal operation or during shutdown of the reactor. After preliminary treatment steps, in particular passage on filters, ion-exchange resins and degasser, the effluents still contain boron which must be concentrated so as to simultaneously produce concentrated boron water and purified water.

The effluent to be treated 1 is fed to an evaporator to perform a water/boric acid separation. The effluent is evaporated through a boiler 2 and fed to the distillation column 3. In the column 3, the difference in boiling temperature between water and boric acid generates a water-enriched vapor stream at the top of the column 3a and a boric acid-enriched liquid stream at the bottom of the column 3b. The gas 4 escaping at the top of column 3a is condensed in its entirety in a condenser 5. A fraction 6 of this stream is extracted and cooled to form purified water 7. The excess 8 is used as reflux for the distillation column 3. Similarly, a fraction 9 of the concentrated boric acid is extracted and cooled. Typical dimensions are of the order of 10 m height and 3 m diameter for the evaporation column.

A recirculation system (not shown in FIG. 1) recycles part of the product flow (6, 9) upstream of each column 3 to satisfy the hydraulic constraints in the columns. Temperatures, operating pressures and liquid flows are controlled to meet the objectives of purity and hydraulic constraints.

The main advantages of thermal processes are that they are very mature. The process is in place on many operating nuclear power plants. A wealth of feedback is available. On the other hand, the process is made of durable materials (steel). It does not generate radioactive waste during operation.

However, the implementation of thermal processes requires facilities of significant size and leads to complex operations, particularly in terms of start-up and flexibility, as well as high costs resulting from the facilities' size and energy consumption and all the related compounds required.

In this context, an attempt was made to improve the situation by proposing an alternative solution based on a membrane process, i.e., using a membrane adapted to ensure the separation of the radiochemical compound from the effluent coming from the primary circuit of nuclear power plants.

Information on these alternative solutions can be found in the documents U.S. Pat. No. 3,380,889, "Processing of nuclear power plant waste streams containing boric acid" (IAEA-TECDOC-911—October 1996), "Reverse osmosis for the recovery of boric acid from the primary coolant at nuclear power plants" (Sarka Bartova—Nuclear Engineering and Design 300 (2016 107-116), or in the document "Best Available Technique Minimising All Nuclides" (Ulrika Bark, Rune Dergström—April 2006—Swedish Environmental Research Institute).

Overall, the above-mentioned documents report tests on the alternative solution of membrane treatment using a reverse osmosis module for separating boric acid. However, while the reverse osmosis modules may have demonstrated their industrial attractiveness for separating boric acid on an industrial scale, until now the attempts to use reverse osmosis modules for separating boric acid in effluents from the primary circuit of a nuclear power plant have not been totally satisfactory and therefore have not been implemented.

In this text, the terms reverse osmosis module and membrane module will be used interchangeably.

This lack of development for membrane treatment techniques seems to be mainly due to the fact that these techniques have not been able to achieve the required concentrations with a production of concentrated boric acid—typically 7500 $mg_B/L$—a production of water with a very low concentration of boric acid—typically <5 $mg_B/L$—with a fluctuating aqueous effluent supply over time during reactor operation and shutdown. Boric acid concentrations are generally expressed in terms of the mass concentration of the chemical element boron ("1 mg$_B$/L" denotes one milligram of the element boron per liter of solution) and not in terms of the mass concentration of boric acid, and the transition from one to the other is made by means of the respective molar masses of the element boron and the boric acid molecule.

Figure 2:
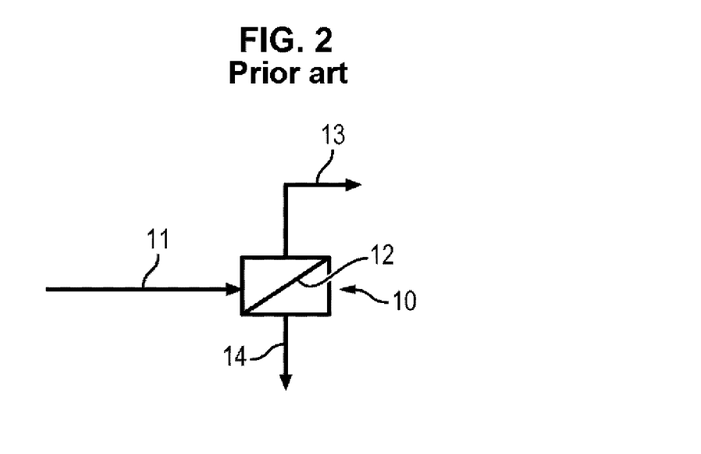
Figure 3:
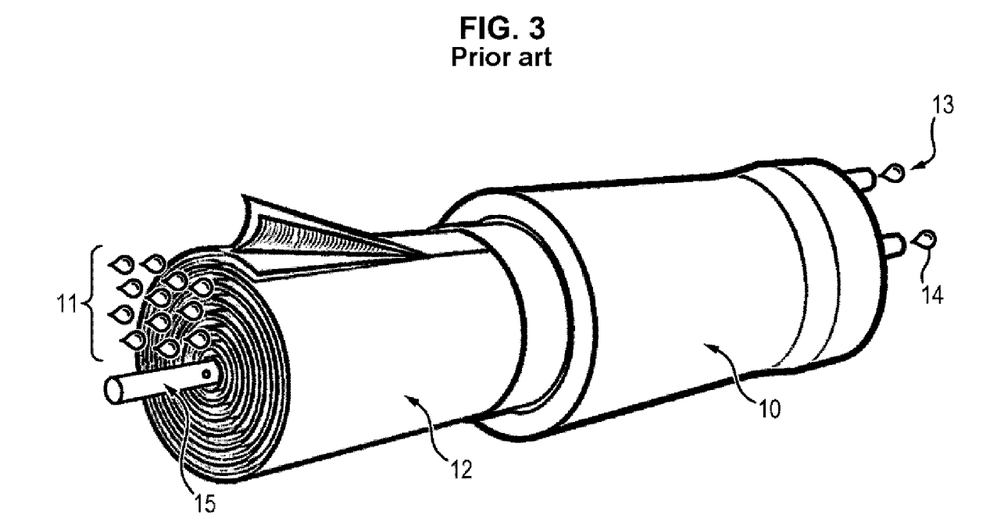

The concept of membrane treatment by reverse osmosis module is shown schematically in FIGS. 2 and 3.

FIGS. 2 and 3 show a reverse osmosis module 10 fed by an aqueous effluent 11. A reverse osmosis membrane 12 lets through a permeate 14 which is a liquid less concentrated in boric acid than the aqueous effluent 11 and retains a retentate 13 which is a liquid more concentrated in boric acid than the aqueous effluent 11. FIG. 3 shows a conventional spiral structure arrangement of the membrane 12. Flat membranes are wound around a collection tube 15. The water to be treated is distributed at one end of the module in the interstices between two flat membranes; the water that has percolated through the membranes is collected in the central tube (permeate 14) and the residual water (retentate 13) is collected at the other end of the module.

DISCLOSURE OF THE INVENTION

The present invention now aims to provide a new process and a new facility that improve the state of the art.

In particular, the present invention aims to provide means which improve the situation in terms of:
  compactness,
  energy consumption, and
  investment cost.

The aforementioned objectives are achieved according to the present invention by a process for treating aqueous effluents from the primary circuit of a nuclear power plant implementing boric acid separation using a reverse osmosis membrane comprising steps consisting in treating the effluents using a multi-stage assembly composed of reverse osmosis modules having a membrane with a high boron rejection rate, arranged in parallel and in series, and recycling the intermediate products at different points in the process.

The present invention thus solves the problem posed thanks to the use of a membrane with a high boron rejection rate.

At this stage, it should be noted that boric acid is a weak acid, characterized by a pKa (acidity constant) of 9.2 at 25° C. present mainly in molecular form (H$_3$BO$_3$) at pH below the pKa, and in ionic form (borate ion, H$_2$BO$_3^-$) above. As the effluents to be treated have a pH lower than the pKa, conventional reverse osmosis has a low rejection rate of boron (as presented in the documents IAEA-TECDOC-911 or "Best Available Technique Minimising All Nuclides") around 60-80%, while the rejection rate of salts, i.e., ionic species dissociated in solution in the aqueous effluent, is higher than 99%.

Reverse osmosis is used to concentrate industrial effluents (including radioactive ones), and to limit the amount of boron in drinking water in seawater desalination (from 5 to 0.5 ppm).

It is proposed here to combine the use of a reverse osmosis membrane with a high boron rejection rate (industrially used in the seawater desalination industry) with a multi-stage process with recycling to treat a feed with a highly variable concentration over time (2000 to 50 ppm) and to achieve treatment objectives (jointly a product concentrated in boric acid at 7500 ppm and a purified water at less than 5 ppm).

It should be noted that the operating conditions as well as the separation objectives are drastically different between seawater desalination and the needs of the invention. In particular, the situation for seawater desalination is more favorable compared with the situation for primary effluent treatment because the pH is higher, the boric acid concentrations are much lower than a few mg$_B$/L and there is only one objective on the permeate side, which is to lower the concentration only by a factor of 10.

The effluents to be treated are much more concentrated in boric acid (typical variation of 1800 to 50 mg$_B$/L depending on the reactor operation) and there are two objectives, one on the retentate side to produce concentrated boric acid (7500 mg$_B$/L, i.e., close to the crystallization point of boric acid) and one on the permeate side to produce purified water (<5 mg$_B$/L).

With respect to the concentration of radioactive effluent—see the tests at Chalk River (IAEA-TECDOC-911) and in the laboratory ("Reverse osmosis for the recovery of boric acid from the primary coolant at nuclear power plants")—the objective of these documents is to produce a waste product corresponding to a very high concentration of boric acid (70 to 90 g$_B$/L) in order to reduce the volume of radioactive effluent to be treated. The boric acid concentration targeted in the context of the invention is much lower than these very high concentrations of 70 to 90 g$_B$/L.

With respect to the tests conducted at the Ringhals nuclear power plant ("Best Available Technique Minimising All Nuclides"), the tests were carried out with membranes that were not selective toward boric acid, and the device tested (two unit modules in parallel) did not allow the production of purified water at a sufficiently low concentration of boric acid, nor boric acid at a sufficiently high concentration.

For a low-concentration boron feed (for example 50 mg$_B$/L), it is necessary to reach a concentration factor of about 150 in the retentate (7500/50) and a dilution factor of 10 in the permeate (50/5). Conversely, for a concentrated boron supply (for example 1800 mg$_B$/L), it is necessary to achieve a concentration factor of about 4 in the retentate (7500/1800) and a dilution factor of 360 in the permeate (1800/5). If over time the boric acid concentration fluctuates, then the separation effort is not localized to the same product over time between the retentate (effort for low boric acid concentrations) and the permeate (effort for high boric acid concentrations).

The dual objective corresponding to two separation products, and the wide range of temporal variation in feed concentration, greatly complicates the proposal of a single technical solution.

According to other advantageous features of the invention:
  the separation steps are adapted to ensure a boric acid concentration of the order of 7500 mg$_B$/L and to carry out a water purification of the order of 5 mg$_B$/L.
  the treatment process operates on effluents to be treated and having a PH much lower than the pKa.
  the boron rejection rate of the membranes is higher than 80%, preferably higher than 90%.
  the membranes are composed of a support, for example of polysulfone, covered with a dense film offering selectivity toward boron, for example of polyamide or polyisobutylene.
  the membranes are made of an organic type material, such as membranes based on asymmetric or composite polymers of polyamide, polyimide, polysulfone, fluorinated polymer, silicone polymer, vinyl polymer, cellulosic polymer, inorganic type material such as carbonaceous molecular sieves, graphenes, zeolites, native or functionalized porous silica, by coating homogeneous or heterogeneous structures, such as charged membranes, in particular with a dispersed phase of the nanoparticle type or functional polymers of the aquaporin type or materials having undergone a surface treatment to improve performance, for example based on fluorination, bromination or sulfonation.

the process implements, on the one hand, a boric acid enrichment zone and a boric acid depletion zone, each composed of several membrane modules, the enrichment zone being responsible for progressively increasing the boric acid concentration and being formed of one or more stages in series to reach the required boric acid concentration, whereas the depletion zone is responsible for progressively reducing the boric acid concentration and is composed of one or more stages in series to reach the required purified water concentration.

each stage consists of several modules in series adapted to handle the flow rate circulating at each stage.

in the enrichment zone, the permeate from each module is recycled after mixing with the process feed or after mixing with the feed of another module of the process or at one of the process outlets.

in the depletion zone the retentate of each module is recycled after mixing with the process feed or after mixing with the feed of another process module or at one of the process outlets.

the model retentates in the enrichment zone bypass at least some of the upstream series modules and go directly to the process outlet for the concentrated boric acid.

the permeates from the modules in the enrichment zone bypass at least one certain upstream module in series to reach directly the process outlet for the purified water.

The process comprises the steps consisting in measuring the boric acid concentration at selected points in the facility and, based on the result of the concentration measurements, performing a step of controlling the modules of the active assembly in order to optimize the output boric acid concentration.

concentration measurements are performed at the inlet and outlet of the membrane module assembly.

concentration measurements are performed on intermediate points of the membrane module assembly.

the boric acid concentration is measured directly, for example by assay.

the boric acid concentration is measured indirectly, for example via the pH.

the boric acid concentration is measured on-line.

the boric acid concentration is measured off-line on a sample basis.

all effluents are recycled to the inlet of a membrane module when the efficiency of the outlet process is measured to be below the treatment objectives.

the invention also relates to a facility adapted for the implementation of the above-mentioned process.

The facility in accordance with the invention, intended for treating effluents from the primary circuit of a nuclear power plant, implementing a separation of boric acid by means of a membrane, is characterized by the fact that it comprises a plurality of stages composed of reverse osmosis modules each comprising a membrane with a high boron rejection rate and means for recycling the intermediate products to different points of the facility.

DESCRIPTION OF THE FIGURES

Other features, purposes and advantages of the present invention will become apparent from the following detailed description and the accompanying drawings, which are given by way of non-limiting examples and wherein.

The previously described FIG. 1 schematically represents a facility in accordance with the state of the art for the separation of boric acid by means of a thermal process, The previously described FIGS. 2 and 3 schematically represent a reverse osmosis module, in a spiral design for FIG. 3.

DETAILED DESCRIPTION OF THE INVENTION

The incoming water, i.e., the effluent to be treated, is originally from intentional discharges of fluid from the primary water circuit and contains boric acid. The boric acid concentration fluctuates during the operation of the nuclear power plant, in a range comprised between 0 and 2000 $mg_B$/L (expressed as mass of boron B per liter of effluent).

The objective of the invention is to jointly produce:
concentrated boric acid, for example at 7500 $mg_B$/L,
purified water with low boric acid content, for example less than 5 $mg_B$/L.

It is proposed to use membrane separation techniques instead of the thermal separation described in the prior art. The solution consists in combining new technological components that have been proven for other industrial applications.

In the proposed solution, the effluent is treated by a multi-stage process composed of reverse osmosis modules with a high boron rejection rate, arranged in parallel and in series, and recycling of intermediate products at different points of the process. The treatment allows the joint generation of concentrated boric acid and purified water, both potentially reusable in the nuclear power plant.

Both products can be reused in the nuclear reactor if the chemical specifications allow it, or can be transferred to an additional processing step.

In the invention, it is proposed to use reverse osmosis membranes with a high boron rejection rate, developed and used in the seawater desalination industry. These membranes have boron rejection rates of the order of 90%.

The boron rejection rate of the membrane $R_m$ is defined as:

$$R_m = 1 - \frac{C_p}{C_m} \quad \text{[Math. 1]}$$

Where $C_p$ is the boron concentration on the permeate side of the membrane and $C_m$ is the boron concentration on the retentate side of the membrane surface.

Figure 4:
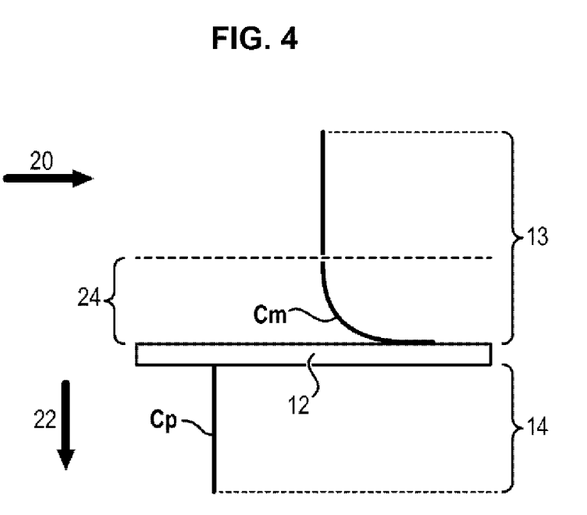
FIG. 4 illustrates the phenomenon of concentration polarization in the vicinity of a membrane.

FIG. 4 schematically illustrates the membrane 12 defining a retentate side 13 and a permeate side 14. The liquid on the retentate side 13 flows in the direction 20, and on the permeate side the liquid flows in the direction 22. A boundary layer 24 on the surface of the membrane defines a zone where the velocity distribution on the retentate side 13 is influenced by the presence of the membrane 12.

The membranes of interest for the invention are characterized by a boron rejection rate higher than conventional membranes, preferably higher than 80%. Current commercial membranes with high boron rejection rates are generally composite membranes consisting of a support (for example of polysulfone) covered with a dense film offering selectivity toward boron (for example of polyamide, polyisobutylene).

The described device is applicable to any type of material presenting a permselectivity (difference of speed of passage of water and boron in steady state), implemented in a membrane cascade for which the different stages are equipped with one or several permselective materials. The materials used can be organic (asymmetric polymeric membranes or composites such as polyamide, polyimide, polysulfone, fluorinated polymers, silicone polymers, vinyl polymers, cellulosic polymers, etc.), inorganic (carbonaceous molecular sieves, graphenes, zeolites, native or functionalized porous silica, etc.), of homogeneous or heterogeneous structures. The heterogeneous character includes charged membranes of the mixed-matrix membranes type (with a dispersed phase of the nanoparticles type or functional polymers of the aquaporins type, etc.) or materials having undergone a surface treatment to improve performance (fluorination, bromination, sulfonation or any type of functionalization, etc.).

The proposed process implements a multi-stage assembly or architecture of boron-selective reverse osmosis modules. Examples of such an architecture are represented in FIGS. 5 and 6.

Figure 5:
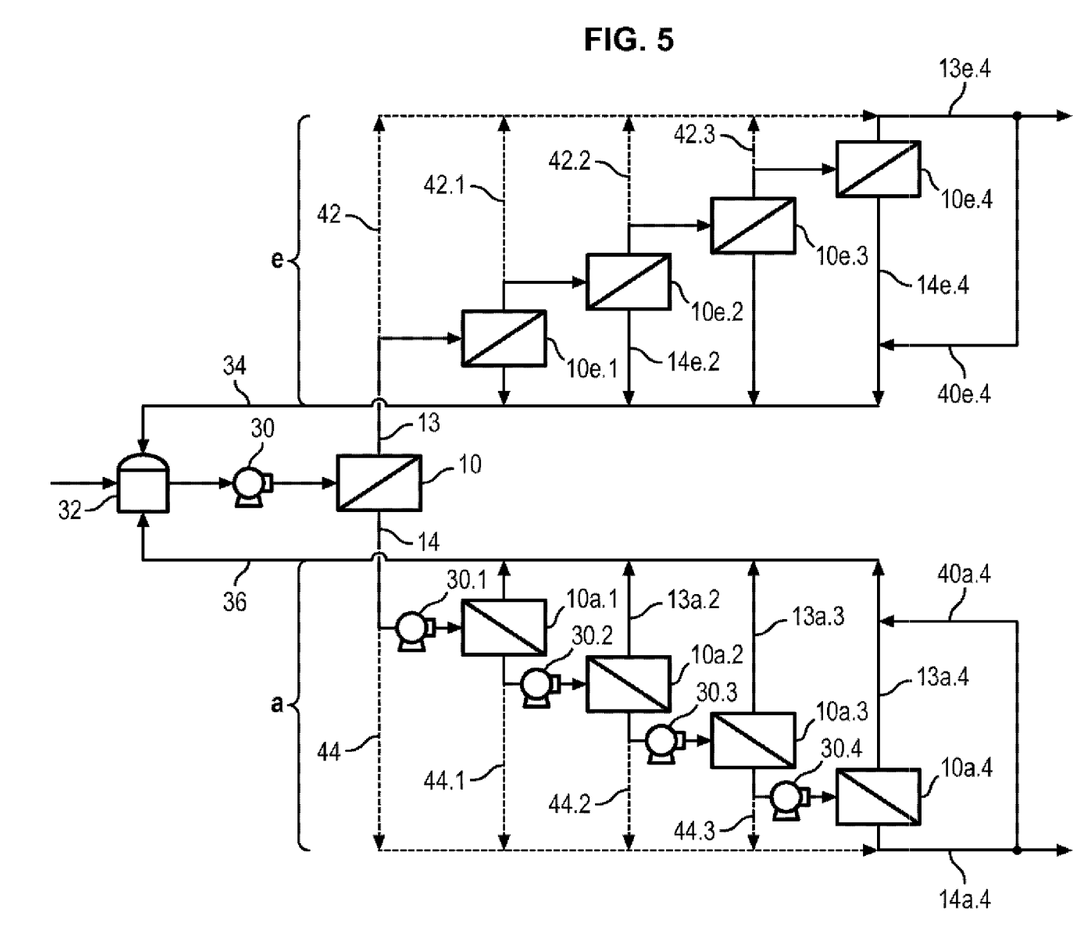
FIGS. 5 and 6 represent two examples of facilities in accordance with the present invention comprising, respectively, a set of four enrichment stages and four depletion stages and a set of three enrichment stages and three depletion stages, FIGS. 7A, 7B, and 7C and respectively 8A, 8B, and 8C represent simulations of boric acid concentration in retentates Cr, membrane Cw and permeate Cp for the figures associated with the index A, simulations of the flow rate to the permeates for the figures associated with the index B and simulations of the osmotic pressure for the figures associated with the index C as a function of the membrane surface area deployed over a stage for a water supply of 12 m³/h at a boric acid concentration of 50 $mg_B$/L for FIG. 7 and respectively 1500 $mg_B$/L for FIG. 8, and FIGS. 9 and 10 represent two examples of management of the module feeds in the different stages as a function of flow rate and boric acid concentration.
Figure 6:
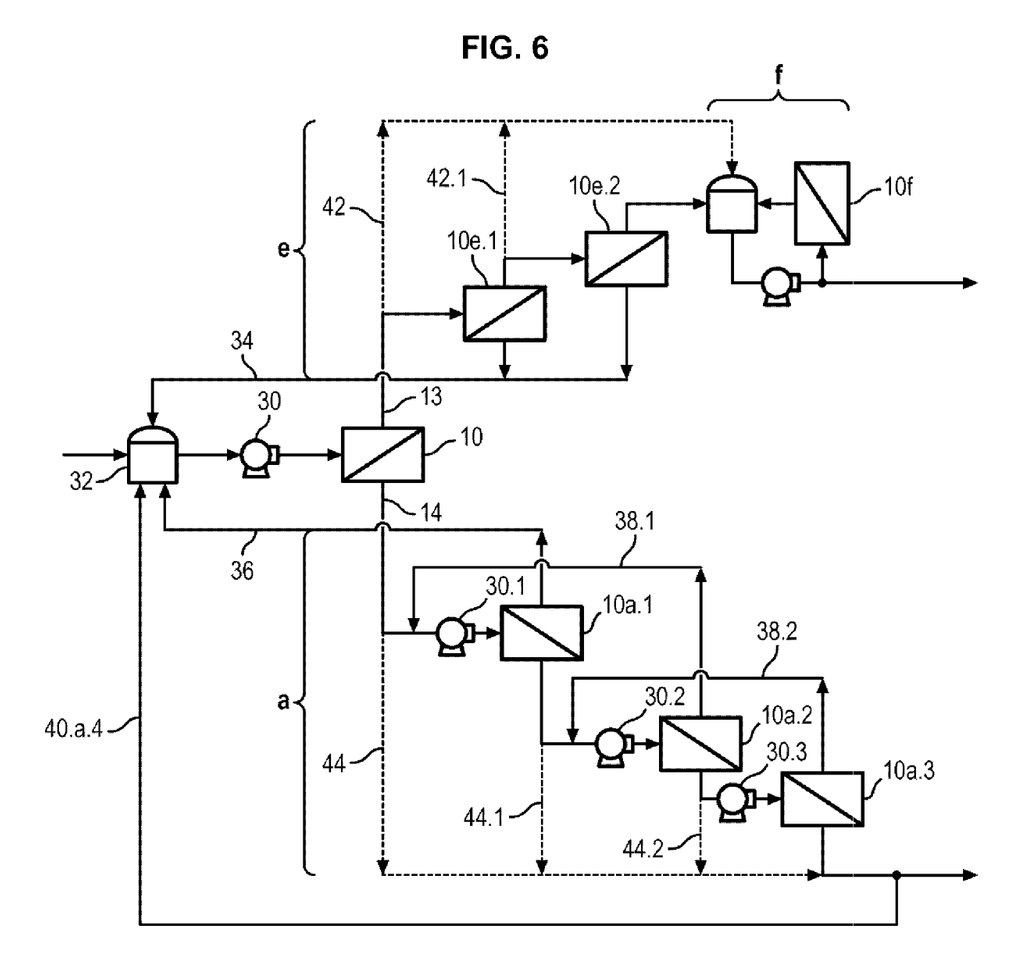
Figure 7A:
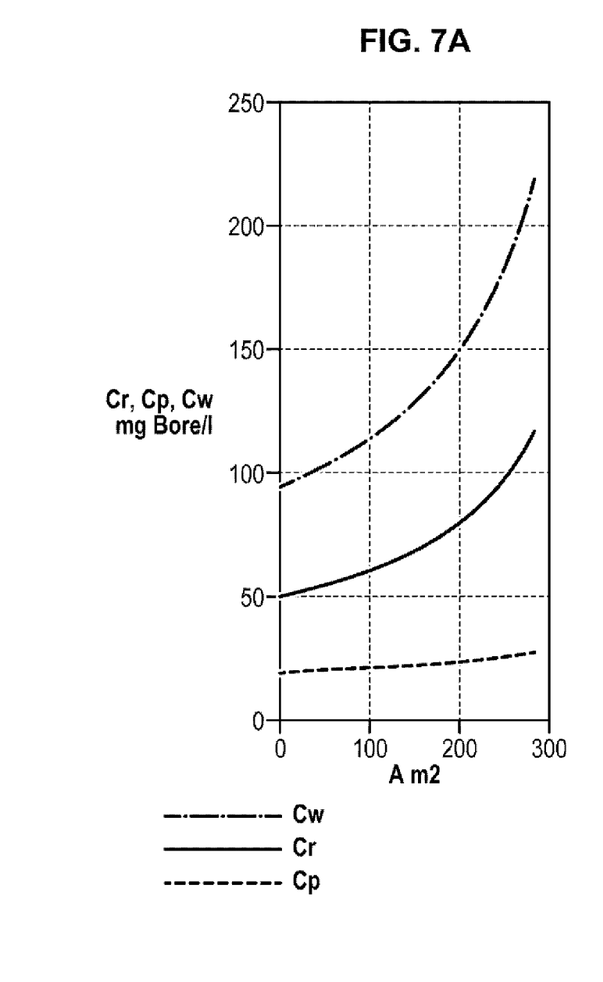
Figure 7B:
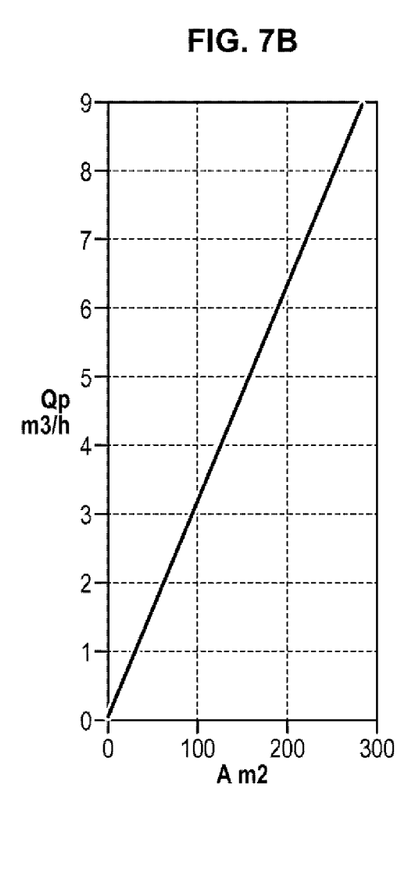
Figure 7C:
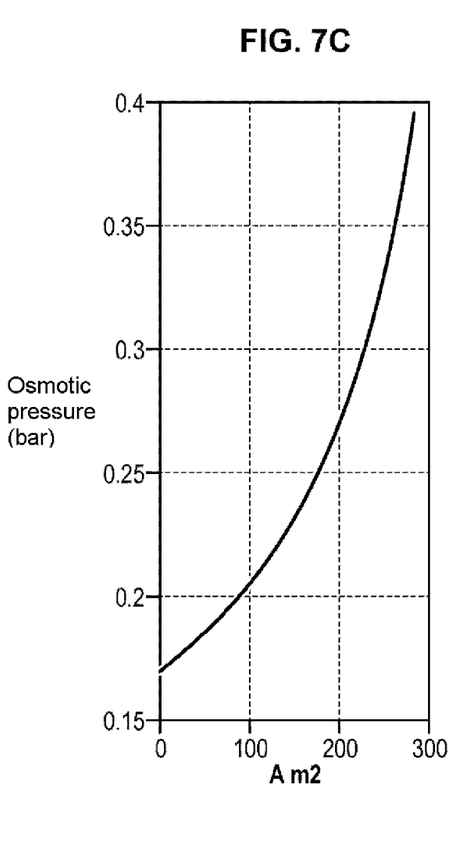
Figure 8A:
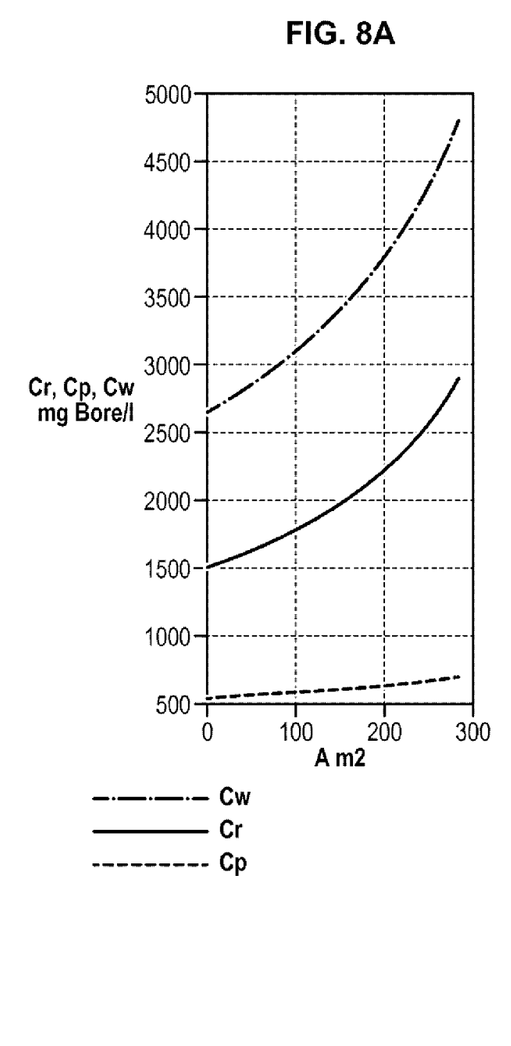
Figure 8B:
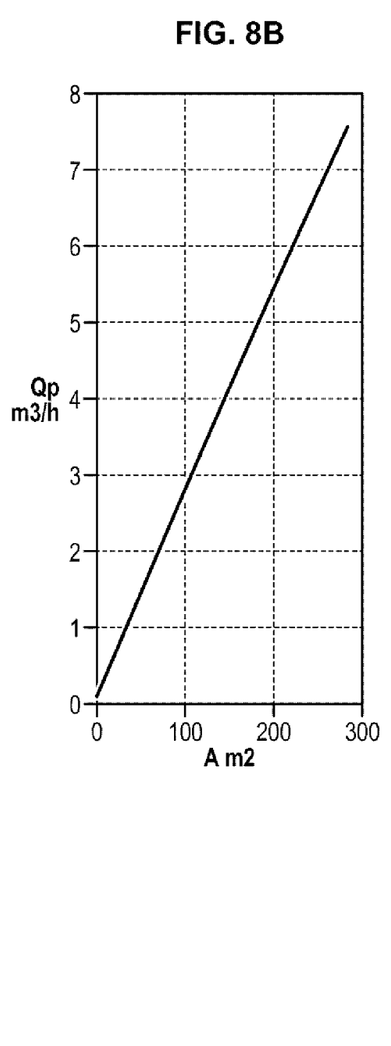
Figure 8C:
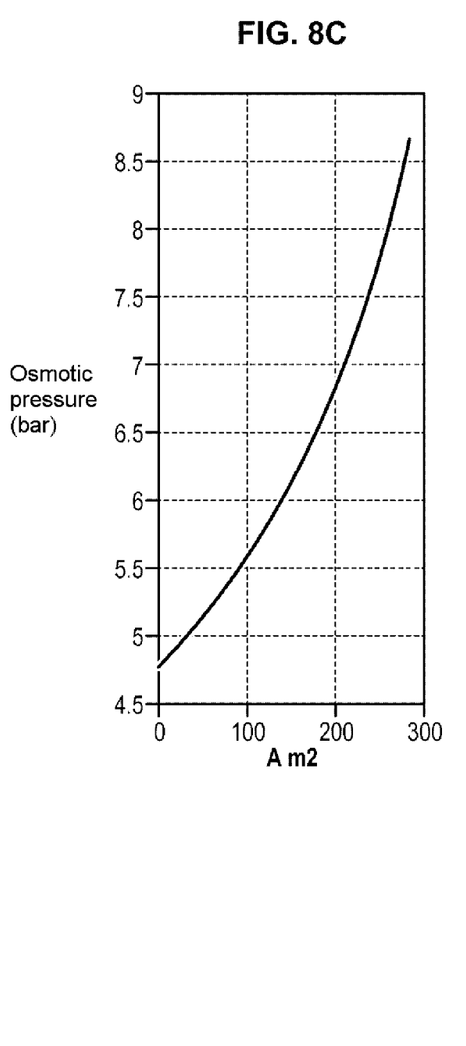

FIG. 5 shows a process using a multi-stage assembly of four enrichment stages, four depletion stages, where the permeates in the enrichment zone and the retentates in the depletion zone are completely recycled to the process feed. Each enrichment and depletion stage generates intermediate products, corresponding to the two outputs—retentate and permeate—of each stage. At each stage of the enrichment zone, the intermediate product of primary interest is the retentate (since it is more concentrated in boric acid than the feed of said stage) and the intermediate product of secondary interest is the permeate (since it is more diluted in boric acid than the feed of said stage). Conversely, at each stage of the depletion zone, the intermediate product of primary interest is the permeate and the intermediate product of secondary interest is the retentate.

It is possible to create a total recycling of an intermediate product, i.e., to return the total flow of an intermediate product generated at one stage to the feed of a stage located further upstream. This is the case in the situation in FIG. 5 for intermediate products of secondary interest that are returned to the general process feed.

It is possible to create a partial recycling, i.e., to return part of the total flow of an intermediate product generated at one stage to the feed of a stage located further upstream. This is the case with connections 40e.4 and 40a.4.

It is possible to create a total or partial bypass, i.e., to send all or part of the total flow of an intermediate product generated at a stage to a process output. This is the case with connections 44, 44.1, 44.2, 44.3, 42, 42.1, 42.2 or 42.3.

FIG. 6 shows a process using a multi-stage assembly of three enrichment stages, three depletion stages, the permeates in the enrichment zone e are totally recycled to the process feed, the retentates in the depletion zone are recycled to the feed of the module preceding their output module. There are also partial recyclings to the feed (grey lines), and bypasses (40a.4). A finishing stage f is placed at the end of the enrichment zone, with recycling of the retentate from the stage to the feed of this same stage, allowing a transient treatment to be carried out through a finishing reverse osmosis stage 10f, circulating in a closed circuit on this tank, until the target boric acid concentration is obtained.

In general, there are different possible options for multi-stage architecture or assemblies, which are presented below and numbered from 1 to 9.

1) the presence of an enrichment zone e and a depletion zone a, each composed of several membrane modules. The zones can for example be defined from the outlet of a first reverse osmosis module 10. The retentate output 13 is sent to the enrichment zone e, and the permeate output is sent to the depletion zone a. A feed module 32 and a pump 30 feed the effluent to be treated to the module 10.

2) the enrichment zone is responsible for gradually increasing the boric acid concentration and is composed of one or more stages in series 10e.1, 10e.2, 10e.3, and 10e.4 to achieve the boric acid concentration specifications. Here, two modules are arranged in series where the retentate output of one module is sent to the input of the next module in the series.

3) the depletion zone is responsible for gradually reducing the boric acid concentration and is composed of one or more stages in series 10a.1, 10a.2, 10a.3, and 10a.4 to achieve the purified water specifications. Here, two modules are arranged in series where the permeate output of one module is sent to the input of the next module in the series, optionally passing through a pump 30.1, 30.2, etc.

Figure 10:
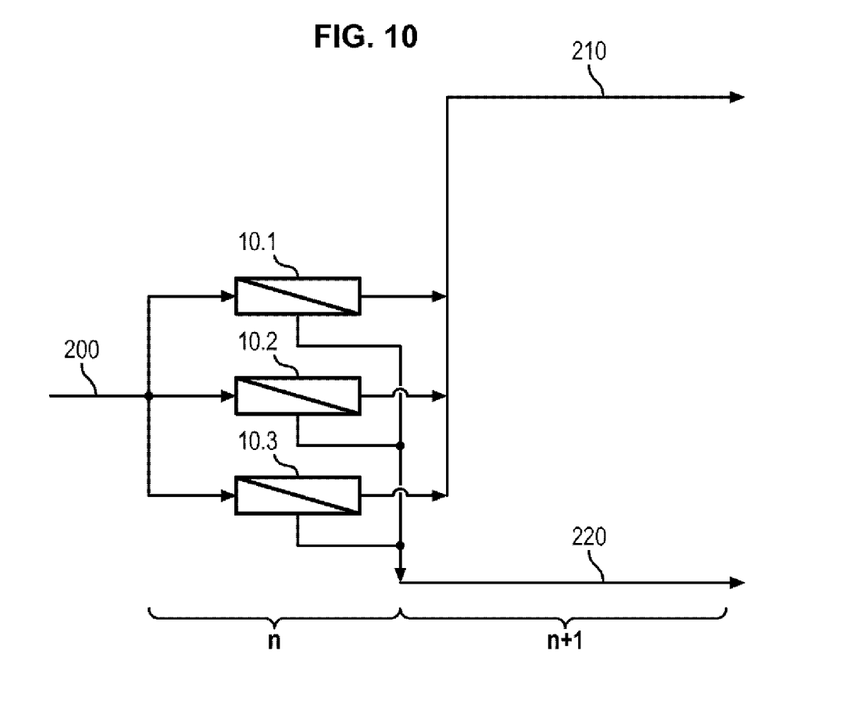

4) each stage consists of one or more modules in parallel to handle the flow through each stage. In FIGS. 5 and 6, only one reverse osmosis module is shown per stage, but there may be several modules arranged in parallel. An arrangement of three modules in parallel is shown in FIG. 10. The three inputs of modules 10.1, 10.2 and 10.3 are connected together to an input channel 200, as are the three retentate outputs connected together to a retentate channel 220 and the three permeate outputs connected together to a permeate channel 210. Such an arrangement has a single inlet 200, a retentate outlet 220, and a permeate outlet 210, similar to a single reverse osmosis module. Thus, it is possible to replace a single reverse osmosis module with an arrangement of three or more modules arranged in parallel.

5) in the enrichment zone e, the permeate 14.e.1, 14.e.2, 14.e.3, etc., of each module can be recycled
   after mixing with the process feed (for example using the channel 34 in FIGS. 5 and 6);

after mixing with the feed from another process module; to one of the process outputs;
6) in the depletion zone a, the retentate 13.a.1, 13.a.2, 13.a.3, etc., of each module can be recycled
after mixing with the process feed (for example using the channel 36 in FIGS. 5 and 6);
after mixing with the feed from another process module (for example using the channels 38.1 and 38.2 in FIG. 6);
to one of the process outputs;
7) each process product, concentrated boric acid and purified water, can be partially recycled at any point in the process (for example using the channels 40e.4 and 40a.4 in FIGS. 5 and 6),
8) the retentates from the modules in the enrichment zone can bypass the upstream series modules and directly reach the process outlet for the concentrated boric acid (for example using the channels 42, 42.1, 42.2 and 42.3 in FIGS. 5 and 6),
9) the permeates from the modules in the enrichment zone can bypass the upstream modules in series to directly reach the process outlet corresponding to the purified water (for example by using the channels 44, 44.1, 44.2 and 44.3 in FIGS. 5 and 6), The choice among these different possible options of architecture or multi-stage assembly from 1 to 6 makes it possible to meet the specifications of the process with respect to the target concentration in concentrated boric acid and in purified water. Features 7 to 9 allow the process to be controlled, so as to adapt the operating conditions according to the boric acid concentration at the process feed (fluctuating over time).

To ensure the passage of water through the membrane, the hydraulic pressure difference on both sides of the membrane must be greater than the osmotic pressure difference (dependent on the concentrations of boric acid and dissolved salts in solution) on both sides of the membrane.

The membrane surface area required for each stage is calculated in order to achieve the desired recovery rate knowing the flow rate to be treated and the applied transmembrane pressure.

The recovery rate is the ratio of the permeate flow rate of a stage to its feed rate.

FIGS. 7A, 7B, 7C, 8A, 8B and 8C show simulation results for an osmosis stage, using the following data (these are reference values determined from experimental laboratory measurements and correspond to an unfavorable design): water permeability $2.2 \cdot 10^{-12}$ m/Pa/s; rejection ratio 0.8; mass transfer coefficient $10^{-5}$ m/s (for calculation of the concentration bias). The curves correspond to a water feed of 12 m$^3$/h with a boric acid concentration between 50 mg$_B$/L (FIGS. 7A, 7B, 7C) and 1500 mg$_B$/L (FIGS. 8A, 8B, 8C) for a transmembrane pressure difference of 40 bar (higher than the osmotic pressure difference).

Increasing the membrane surface area increases the permeate flow rate (and thus the recovery rate) and the retentate concentration. On the other hand, the permeate concentration also increases, as well as the osmotic pressure.

Once the characteristic parameters of the membrane are determined from experimental measurements (water permeability, rejection rate, mass transfer coefficient), this type of simulation makes it possible to choose the best conditions to reach the desired specifications.

The process is scaled up by choosing a multi-stage process architecture or assembly from the possibilities described above, and by defining the hydraulic pressures and the deployed membrane surfaces at each stage:

The hydraulic pressures must be higher than 1 bar and lower than 80 bar, preferentially between 5 and 50 bar The recovery rate for each stage should preferentially be less than 90%

The recycling rates, i.e., the fraction of the flow recycled to the feed, of each product can vary from 0 to 99%, preferentially from 0 to 50%

These choices must ensure the separation performance of the process whatever the boric acid concentration in the process feed. The operating conditions can be adapted over time in order to manage this temporal fluctuation.

The purpose of the process control is to measure the separation efficiency of the process, as well as to adapt the operating conditions in order to maintain the target concentrations of concentrated boric acid and purified water despite the variation of the boric acid concentration in the feed.

The separation efficiency of the system can be monitored by measuring (continuously or by spot sampling) the concentrations of substances of interest at different points of the process. The boric acid concentration can be measured at the inlet of the reverse osmosis system, as well as at the concentrated boric acid and purified water outlets. Intermediate measurements can also be used to complete this information. The boric acid concentration can be measured directly (for example by assay) or indirectly (for example via pH), on-line or off-line using a suitable sampling device.

On the one hand, the effect of fluctuating concentration at the process feed can be compensated for by managing the feed to the osmosis modules. Depending on the boric acid concentration at the process feed, the same stage will be fed with fluctuating flow rates and concentrations.

Figure 9:
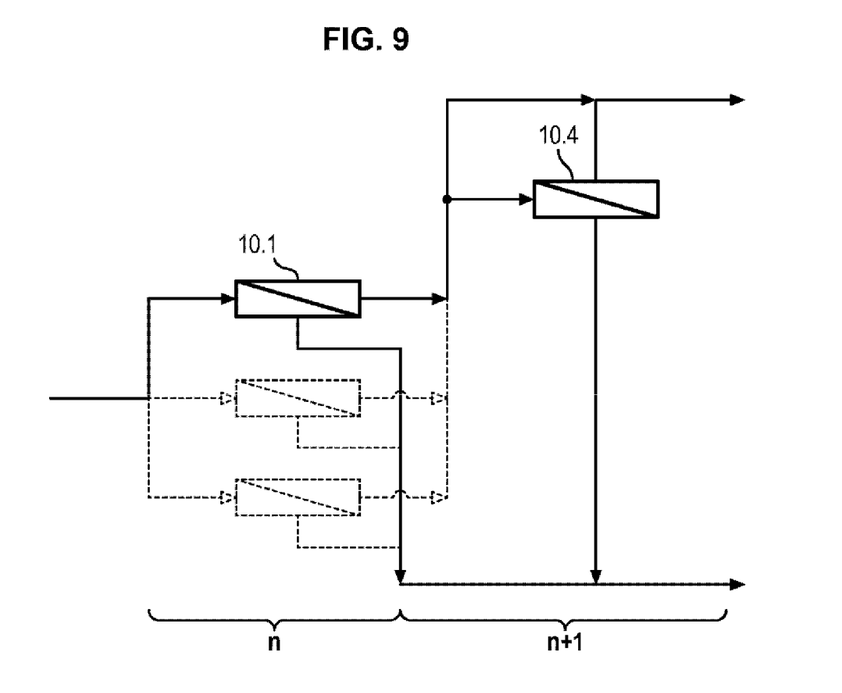

In general, the number of modules in parallel on the same stage should be increased when the flow rate is higher, in order to have more membrane surfaces. It is also advisable to increase the number of stages in series when the separation objectives are more difficult to achieve. This is particularly the case when the boric acid concentration is lower in the enrichment zone or higher in the depletion zone. FIG. 9 illustrates the situation of two reverse osmosis modules arranged in series, in two consecutive stages n and n+1. FIG. 10 illustrates the situation of three reverse osmosis modules arranged in parallel, in two consecutive stages n and n+1, with stage n+1 comprising no reverse osmosis module. The multi-stage architecture or assembly of FIG. 9 is more suitable than that of FIG. 10 when the flow rate to be treated is lower and the separation objectives are more difficult to achieve.

On the other hand, operating parameters can be adjusted, such as the recycling rates of each of the process products, as well as the operating pressures (via the use of feed pumps and adjustable valves).

Finally, if the measured efficiency is below the treatment objectives, all effluents can be recycled to the feed to increase the effluent throughput time in the process.

The advantages of the proposed solution over the processes concern:

Compactness: membrane modules generally deploy exchange surfaces between phases of several thousand m$^2$ per m$^3$, compared with a few hundred for the linings and trays of thermal processes. In particular, thermal processes by evaporation require a height of the order of 10 meters, compared with about 2 meters for membrane processes. This aspect reduces the cost of civil engineering in particular.

Energy expenditure: the process operates at a temperature close to room temperature and does not require vaporizing part of a liquid phase. The process consumes a few hundred kilowatts of electricity, compared with several megawatts of heat for evaporation.

The modularity of the system, allowing easy adaptation of the design and operation.

Flexibility, by dispensing with the hydrodynamic constraints (clogging, weeping) of thermal processes.

Economic gains on the investment cost (smaller footprint, gas/liquid contactor made of plastic instead of steel) and operating costs on the utilities (no need for steam, less energy consuming).

In the context of the present invention, when values are indicated, they should be considered as giving an indicative value that may change within a range of the order of plus or minus 10% of the indicated value.

Of course, the present invention is not limited to the above-described embodiments but extends to any alternatives consistent with its spirit.

The invention claimed is:

1. A process for treating aqueous effluents comprising:
    separating boric acid from aqueous effluents from a primary circuit of a nuclear power plant,
    treating the aqueous effluents using a multi-stage assembly composed of multiple reverse osmosis modules, a general inlet, at least two general outlets, and multiple recycling lines,
        wherein each of the multiple reverse osmosis modules comprises an inlet, an outlet, and a reverse osmosis membrane configured to let through a permeate which is less concentrated in the boric acid than an incoming liquid in the reverse osmosis membrane and to retain a retentate which is more concentrated in the boric acid than the incoming liquid, and wherein the multiple reverse osmosis modules are arranged in parallel and in series so as to define a one-way fluidic circuit from the general inlet to the at least two general outlets, and
        wherein each of the multiple recycling lines fluidically connects the outlet of a first reverse osmosis module of the multiple reverse osmosis modules with:
            the general inlet,
            one of the at least two general outlets when the one-way fluidic circuit does not directly connect the outlet of the first reverse osmosis module to the one of the at least two general outlets, or
            the inlet of a second reverse osmosis module of the multiple reverse osmosis modules when the one-way fluidic circuit does not directly connect the outlet of the first reverse osmosis module to the inlet of the second reverse osmosis module,
    obtaining a boric acid fluid having a boric acid concentration between 6750 $mg_B/L$ and 8250 $mg_B/L$ at a first of the at least two general outlets in a boric acid enrichment zone of the multi-stage assembly, and
    obtaining a purified fluid having a boric acid concentration comprised between 4.5 $mg_B/L$ and 5.5 $mg_B/L$ at a second of the at least two general outlets in a boric acid depletion zone of the multi-stage assembly,
    wherein each of the boric acid enrichment zone and the boric acid depletion zone comprises one or more of the multiple reverse osmosis modules, and one or more stages in series, wherein each of the one or more stages consist of the one or more of the multiple reverse osmosis modules arranged in parallel,
    the boric acid concentration in the boric acid enrichment zone is progressively increased so as to reach a desired boric acid concentration,
    the boric acid concentration in the boric acid depletion zone is progressively reduced so as to reach a required purified water concentration, and
    the boric acid concentration is measured at selected points of the multi-stage assembly, and based on the result of the concentration measurements:
        introducing a fraction of the boric acid fluid into an incoming fluid of the second reverse osmosis module through one of the multiple recycling lines,
        introducing a fraction of the purified fluid into the incoming fluid of the second reverse osmosis module through one of the multiple recycling lines,
        introducing into the boric acid fluid the retentate of the first reverse osmosis module through one of the multiple recycling lines, when the first reverse osmosis module is located in the boric acid enrichment zone, or
        introducing into the purified fluid the permeate of the first reverse osmosis module through one of the recycling lines, when the first reverse osmosis module is located in the boric acid depletion zone.

2. The process for treating aqueous effluents as claimed in claim 1, wherein the aqueous effluents have a pH lower than the pKa of the boric acid.

3. The process for treating aqueous effluents as claimed in claim 1, wherein the reverse osmosis membrane has a boron rejection rate of greater than 80%.

4. The process for treating aqueous effluents as claimed in claim 1, wherein the reverse osmosis membrane is composed of a support covered with a dense film of polyamide or polyisobutylene.

5. The process for treating aqueous effluents as claimed in claim 1, wherein the reverse osmosis membrane is formed from an organic material or an inorganic material in a form of homogeneous or heterogeneous structures.

6. The process for treating aqueous effluents as claimed in claim 1, wherein the permeate of each of the multiple reverse osmosis modules of the boric acid enrichment zone is mixed:
    with the aqueous effluents from the primary circuit of the nuclear power plant, or
    with an incoming fluid of another reverse osmosis module, or
    with the boric acid fluid, or
    with the purified fluid.

7. The process for treating aqueous effluents as claimed in claim 1, wherein the retentate of each of the multiple reverse osmosis modules of the boric acid depletion zone is mixed:
    with the aqueous effluents from the primary circuit of the nuclear power plant, or
    with an incoming fluid of another reverse osmosis module, or
    with the boric acid fluid, or
    with the purified fluid.

8. The process for treating aqueous effluents as claimed in claim 1, wherein retentate of each of the multiple reverse osmosis modules of the boric acid enrichment zone is mixed with the boric acid fluid.

9. The process for treating aqueous effluents as claimed in claim 1, wherein permeate of each of the multiple reverse osmosis modules of the boric acid depletion zone is mixed with the purified fluid.

10. The process for treating aqueous effluents as claimed in claim 1, wherein the measuring of the boric acid concentration is performed at the general inlet and at the at least two general outlets of the multi-stage assembly.

11. The process for treating aqueous effluents as claimed in claim 1, wherein the measuring of the boric acid concentration is performed at points located between the general inlet and the at least two general outlets of the multi-stage assembly.

12. The process for treating aqueous effluents as claimed in claim 1, wherein the measuring of the boric acid concentration is performed directly.

13. The process for treating aqueous effluents as claimed in claim 1, wherein the measuring of the boric acid concentration is performed indirectly.

14. The process for treating aqueous effluents as claimed in claim 1, wherein the measuring of the boric acid concentration is made on-line.

15. The process for treating aqueous effluents as claimed in claim 1, wherein the measuring of the boric acid concentration is made off-line based on a sample.

16. The process for treating aqueous effluents as claimed in claim 1, wherein the permeate of each of the multiple reverse osmosis modules or the retentate of each of the multiple reverse osmosis modules is mixed with the aqueous effluents when the boric concentration at one of the at least two general outlets is measured to be less than the desired boric concentration.

17. The process for treating aqueous effluents as claimed in claim 3, wherein the boron rejection rate of each of the multiple reverse osmosis membranes is greater than 90%.

18. The process for treating aqueous effluents as claimed in claim 5, wherein the reverse osmosis membrane comprises asymmetric polymers or composite of a polyamide, a polyimide, a polysulfone, a fluorinated polymer, a silicone polymer, a vinyl polymer, or a cellulosic polymer.

19. The process for treating aqueous effluents as claimed in claim 5, wherein the reverse osmosis membrane comprises carbon molecular sieves, graphenes, zeolites, native or functionalized porous silica.

20. The process for treating aqueous effluents as claimed in claim 5, wherein the reverse osmosis membrane is charged.

21. The process for treating aqueous effluents as claimed in claim 5, wherein the reverse osmosis membrane comprises a dispersed phase of a nanoparticle type or functional polymers of an aquaporin type.

22. A facility for treating aqueous effluents from a primary circuit of a nuclear power plant, wherein the aqueous effluents comprise boric acid, the facility comprising:
a multi-stage assembly composed of multiple reverse osmosis modules, a general inlet, at least two general outlets, and multiple recycling lines,
wherein each of the multiple reverse osmosis modules comprises an inlet, an outlet, and a reverse osmosis membrane configured to let through a permeate which is less concentrated in the boric acid than an incoming liquid in the reverse osmosis membrane and to retain a retentate which is more concentrated in the boric acid than the incoming liquid, and wherein the multiple reverse osmosis modules are arranged in parallel and in series so as to define a one-way fluidic circuit from the general inlet to the at least two general outlets, and
wherein each of the multiple recycling lines fluidically connects the outlet of a first reverse osmosis module of the multiple reverse osmosis modules with:
the general inlet,
one of the at least two general outlets when the one-way fluidic circuit does not directly connect the outlet of the first reverse osmosis module to the one of the at least two general outlets, or
the inlet of a second reverse osmosis module of the multiple reverse osmosis modules when the one-way fluidic circuit does not directly connect the outlet of the first reverse osmosis module to the inlet of the second reverse osmosis module,
wherein the multi-stage assembly comprises a boric acid enrichment zone and a boric acid depletion zone, each of the boric acid enrichment zone and the boric acid depletion zone comprises one or more of the multiple reverse osmosis modules, and one or more stages in series, wherein each of the one or more stages consist of the one or more of the multiple reverse osmosis modules arranged in parallel, and
wherein the facility further comprises boric acid concentration sensors at selected points of the multi-stage assembly and the multiple recycling lines being configured to, based on results provided by the boric acid concentration sensors:
introduce a fraction of the boric acid fluid into an incoming fluid of the second reverse osmosis module through one of the multiple recycling lines,
introduce a fraction of the purified fluid into the incoming fluid of the second reverse osmosis module through one of the multiple recycling lines,
introduce into the boric acid fluid the retentate of the first reverse osmosis module through one of the multiple recycling lines, when the first reverse osmosis module is located in the boric acid enrichment zone, or
introduce into the purified fluid the permeate of the first reverse osmosis modules through one of the multiple recycling lines, when the first reverse osmosis module is located in the boric acid depletion zone.

* * * * *